United States Patent [19]
King et al.

[11] Patent Number: 5,978,454
[45] Date of Patent: Nov. 2, 1999

[54] METHOD AND INSTRUCTIONS FOR FAX MAIL USER INTERFACE

[75] Inventors: Michael Craig King, Boulder; Cynthia Lea Humphrey, Golden; John Reiley Rice, Englewood; Steven John Langkamp, Denver, all of Colo.; Sandra Marie Smith, Phoenix, Ariz.

[73] Assignees: MediaOne Group, Inc., Englewood; U S West, Inc., Denver, both of Colo.

[21] Appl. No.: 08/977,694

[22] Filed: Nov. 25, 1997

Related U.S. Application Data

[63] Continuation of application No. 07/802,939, Dec. 6, 1991, abandoned.

[51] Int. Cl.[6] .................................................. H04M 11/00
[52] U.S. Cl. ............................. 379/100.08; 379/102.02; 358/402
[58] Field of Search ......................... 379/100.08, 100.09, 379/100.11, 102.02, 93.26, 102.01, 89, 88.13, 88.24, 88.25; 358/402, 403

[56] References Cited

U.S. PATENT DOCUMENTS

| | | | |
|---|---|---|---|
| 4,899,369 | 2/1990 | Kondziela | 379/105 |
| 4,918,722 | 4/1990 | Duehren et al. | 379/100 |
| 4,989,238 | 1/1991 | Iggulden et al. | 379/100 |
| 4,994,926 | 2/1991 | Gordon et al. | 379/100 |
| 4,996,704 | 2/1991 | Brunson | 379/100 |
| 4,996,707 | 2/1991 | O'Malley et al. | 379/88 |
| 5,008,926 | 4/1991 | Misholi | 379/89 |
| 5,090,049 | 2/1992 | Chen | 358/400 |
| 5,291,302 | 3/1994 | Gordon et al. | 379/100.13 |

*Primary Examiner*—Stella Woo
*Attorney, Agent, or Firm*—Brooks & Kushman

[57] ABSTRACT

A user interface for a fax mail system. The invention is a method and instructions for improving interaction with a fax mail system. The sequence of instructions is improved to allow easier interaction. The system allows the subscriber to print all new fax documents which have been received without reviewing them. In addition, the review menu is organized to allow the subscriber to easily print, erase or skip various fax mail messages.

9 Claims, 6 Drawing Sheets

METHOD AND INSTRUCTIONS FOR FAX MAIL USER INTERFACE

This application is a continuation of application Ser. No. 07/802,939, filed Dec. 6, 1991, now abandoned.

BACKGROUND OF THE INVENTION

1. Field of the Invention

This invention relates to the field of telephony. More particularly, the invention relates to facsimile (fax) mail systems. In still greater particularity, the invention relates to a user interface for a fax mail system. By way of further characterization, but not by way of limitation thereto, the invention relates to prompting a user with instructions to access various options in a fax mail system.

2. Description of the Prior Art

Facsimile (fax) communications have become increasingly popular in recent years. The increased use of fax machines and the resultant proliferation of fax transmissions has even gained the attention of the United States Congress in trying to limit "junk" fax documents. While, initially, fax machines were cumbersome and expensive, they are now getting more compact and portable. Doing business by fax has become increasingly commonplace. Sales people can fax orders and a warehouse can, in return, fax invoices. In short, what used to take days to accomplish through the U.S. Mail can now be accomplished in a matter of minutes by utilizing fax machines.

The increasing use of fax machines and the proliferation of fax documents has led some people to try to manage their fax documents. Thus, some method for retaining the fax mail would be useful. Of course, it is possible to keep the hard copies of the faxes in a stack and read them when it is convenient as is done with regular mail. However, in a mobile society and, in particular, in a highly mobile business environment, transporting a large number of hard copy faxes while traveling can be burdensome and the risk of losing the faxes is increased. It would be useful if such faxes could be stored electronically.

In addition to the problems with storing fax transmissions, it is desirable in many cases to allow remote printing of fax documents where and when desired. That is, a fax is generally sent to a specific fax machine as identified by the fax telephone number. However, it may be that the intended recipient is at a different location (e.g. for a meeting or traveling out of state). In such a situation the fax received at a first location would have to be re-faxed to the second location. This is inconvenient and may result in poor quality of the re-faxed document. Thus, for individuals who are not at the same location one hundred percent (100%) of the time, it would be useful to have a system which would allow the printing of the fax transmission at a location other than the primary fax location telephone number to which the original fax was sent.

The use of portable fax machines has helped in sending or receiving fax transmissions from remote or unforeseen locations. However, in the past, these portable fax machines have only been useful to send a fax. To receive fax transmissions the recipient generally must stay at one location long enough to receive the transmission and the timing must be coordinated with the sender. For example, a traveling business person may be waiting for a fax and wish to receive it at an airport during an air travel layover. If that person has a portable fax machine and can coordinate with the sender to send the fax transmission while the business person is on the telephone, this may prove satisfactory. However, if for some reason, the sender cannot send the transmission (the sending fax machine may be in use) at that exact moment, the recipient must wait on the line incurring additional cost (if a long distance call) and wasting time. If the fax could be sent to one telephone number (fax mailbox) and retrieved at will by the recipient, then time and money would be saved. The business person could then retrieve the fax transmission at a time and place which is convenient. For example, the business person could get the fax transmission from the public phone at the airport during the layover at his or her convenience or possibly this traveler may wish to retrieve the fax once he or she checks into a hotel room.

Another problem encountered with increased use of fax machines is confidentiality. Specifically, unless a recipient knows exactly when a fax transmission will be received, he or she will not be waiting to receive it. Thus, for some period of time that faxed document is available for anyone to pick up and read. If the recipient had more control over the time and place of receipt, confidentiality could be maintained.

In order to overcome the above limitations, fax mail systems have recently been offered which allow the recipient to receive the fax transmissions at a preselected telephone number (electronic fax mailbox) and retrieve them at will from a different location. One limitation of existing fax mail systems has been that many of them are complicated to operate and thus many helpful options are not utilized. That is, the recipient interacts with the fax mail system through a touchtone phone and, if the interaction is difficult, many fax mail subscribers will not be able to interact effectively. Users encountering difficulty will either not subscribe to the system initially or, if they do subscribe, they will later discontinue the service. Thus, it is critical that a fax mail system be easy to understand and use in order that a fax recipient utilize all of the options available. While being easy to use, the system must also be sophisticated to the extent that the fax recipient can obtain all of the necessary fax mail information and utilize available customization options to make the system useful.

SUMMARY OF THE INVENTION

The invention is an interface which utilizes a dual tone multifrequency (DTMF) keypad of a touchtone phone or fax machine to interact with a fax mail system. The user responds to system voice prompts and enters appropriate commands by pressing a key on the DTMF keypad.

The present invention utilizes a new feature which allows the subscriber, upon entering the main menu, to print all new faxes which have been received. This feature eliminates the requirement for the subscriber to review the fax mail messages which have been received since the subscriber last retrieved messages. That is, the subscriber can command the system to print all new fax messages, select a print destination, and he or she can immediately leave the system. In prior art systems the subscriber must interact with the system to determine specifically which fax messages he or she wishes to print. This new feature thus saves time and reduces telephone charges by reducing the amount of time the subscriber spends on the telephone line. In addition, the present invention includes a review menu which allows the subscriber to review the fax mail messages individually and easily print, erase, skip or back up to a previous menu location.

DESCRIPTION OF THE PREFERRED EMBODIMENT

Figures 1, 3:
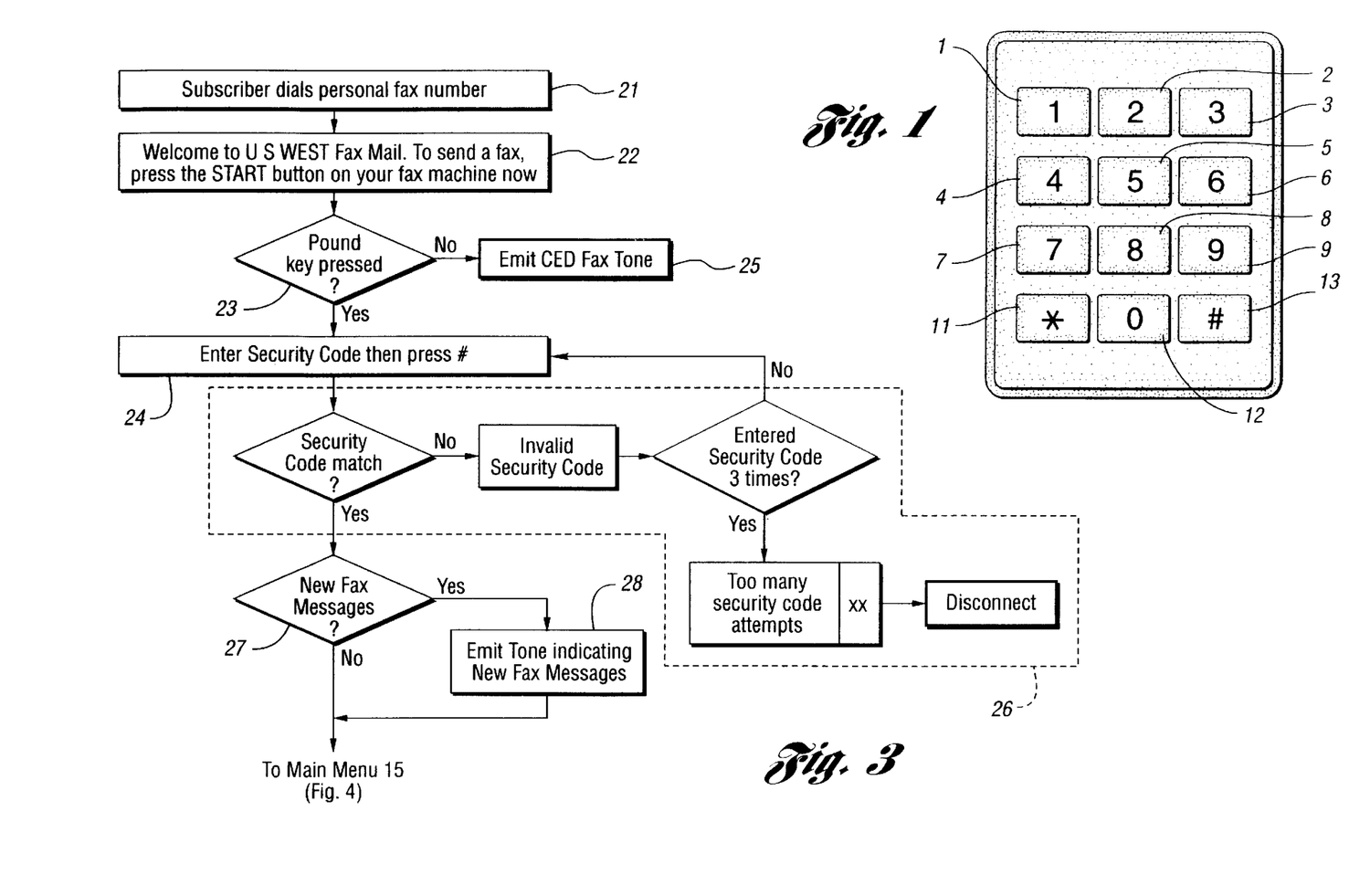
FIG. 1 illustrates a dual tone multifrequency (DTMF) telephone keypad.
FIG. 3 is a schematic of the access instructions to enter the fax mail system.

Referring to FIG. 1, a DTMF (dual tone multifrequency) telephone keypad is shown. The top three rows of keys are numbered one through 9. The lower row contains three keys "*", "0" and "#", numbered 11, 12 and 13 respectively. This DTMF keypad is standard in the telephone industry and is what is used by the telephone subscriber to interact with the fax mail system described herein. Thus, reference to pressing 1, 5, #, etc will refer to the depression by the telephone user of the designated key on the DTMF keypad. Throughout the application like reference numerals denote like items throughout each of the various figures.

Both the owner of the mailbox (subscriber or recipient) and those who will be sending fax documents to the mailbox owner (contributors or senders) will access the service via the same telephone number. Upon being connected, a prompt will be played followed by five seconds of silence before a fax tone is placed on the line. The subscriber enters the fax mailbox by pressing the # key on the DTMF keypad during the period when the telephone line is connected to the fax mail system and before a fax tone is placed on the line. This action delineates subscriber usage of the mailbox from sender usage. Fax documents sent to the mailbox automatically will be received as they would by any fax machine.

This description focuses on the subscriber interface. As shown in FIG. 1, the interface medium is a dual tone multifrequency (DTMF) keypad of a touchtone telephone. The subscriber responds to system voice prompts and enters the appropriate commands by pressing the designated key. Experienced subscribers can interrupt most prompts by pressing designated keys. That is, experienced users can "type ahead" to bypass most prompts as a way of speeding up interaction with the service. Users may also enter several commands at once (stack commands) to quickly reach a location in the interface, bypassing the dialog that a novice user would hear at each selection point in the interface. DTMF commands will be recognized by the system when a prompt is interrupted.

There are three global commands which are used consistently during access to the system and its options. That is, the function of the "*" key indicated as 11 in FIG. 1, the "0" indicated as 12 in FIG. 1 and the "#" key indicated as 13 in FIG. 1 never changes. The * key is used to cancel commands, return to the previous menu or exit the system. During or immediately after a recording or input procedure, * erases the entry and yields a re-record or re-enter prompt. Pressing * while listening to the prompts of a submenu returns the system to the previous menu. The # key is used to inform the platform that the user has completed some action or wants to skip ahead. Pressing # after an entry such as a security code or greeting signifies that the entry or recording is complete. This key also allows the subscriber to skip over a greeting or a voice annotation to a fax message.

The * (11) key is consistently associated with backing up, starting over, or quitting in order to allow the user to identify this key with one general-type function. The "*" (11) key is optimal for this purpose because it is not a numeric key and thus is special to users, because it is on the left side of the keypad and thus associated with backing up. The "#" (13) is optimal for completion or skip ahead because as with the * key it is not a numeric key and is special and because, in the case of the # key, it is on the right side of the keypad, generally indicating moving forward.

The system provides th,e subscriber with the capability of receiving fax documents in a mailbox for printing at a desired time and place. The subscriber will be notified via pager or voice messaging when a fax document reaches the mailbox. Fax documents that reach a mailbox are considered new. Once retrieved and successfully printed, they are reclassified in the mailbox as old fax messages. If left unretrieved by the subscriber for more than 14 days, such fax messages are automatically deleted.

Figure 2:
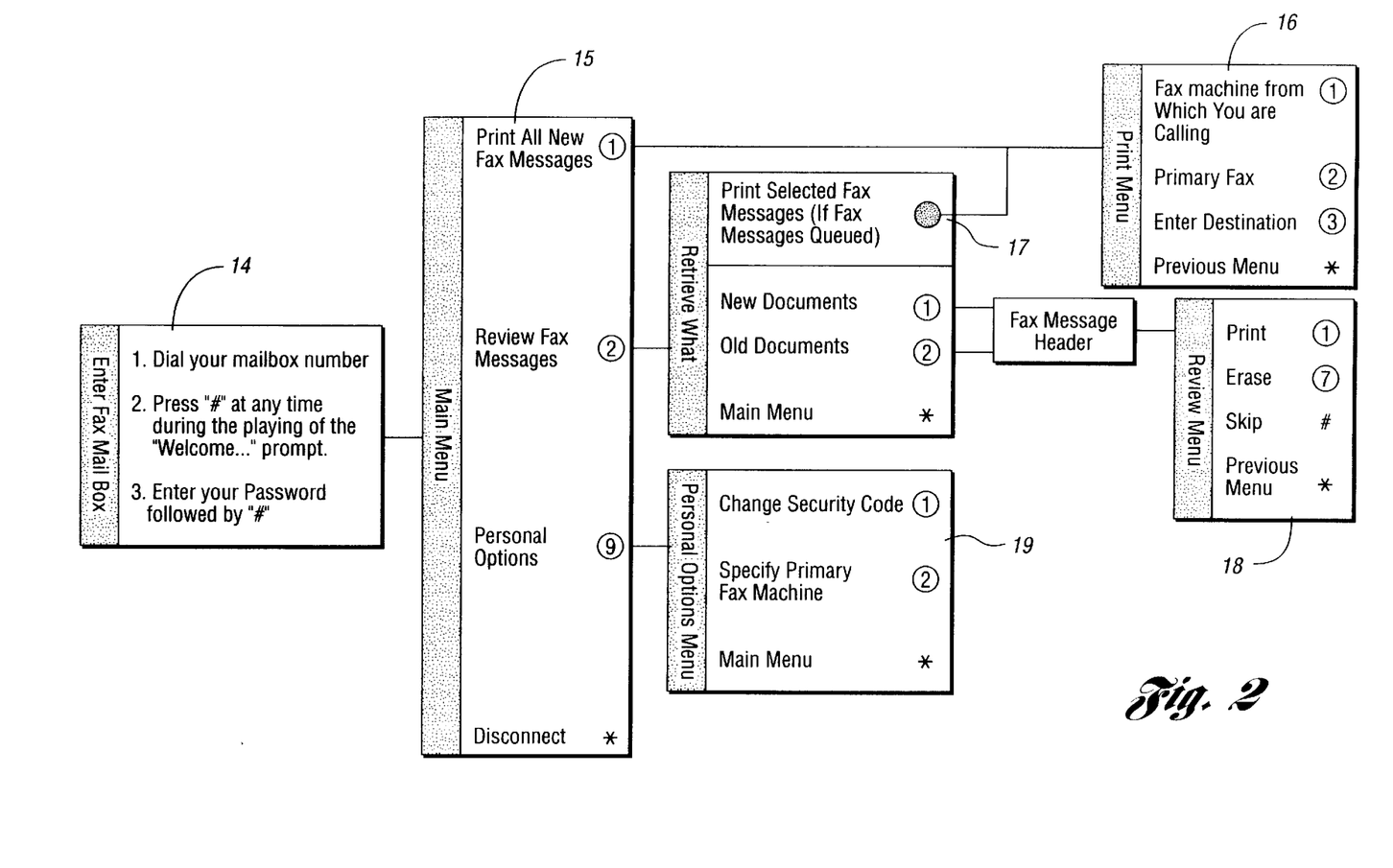
FIG. 2 is a simplified schematic of the fax mail interface of the present invention.

Referring to FIG. 2, the fax mail system of the present invention is summarized in a flow chart format. Specifically, the system access is summarized at 14. The mailbox number is dialed and the # key (13) is pressed during the prompt to allow the subscriber to enter the password. At that point, main menu 15 is accessed. Main menu 15 allows the subscriber to print all new fax messages by pressing 1, to review fax messages by pressing 2, to change personal options by pressing 9 and to disconnect by pressing the "*" (13) key.

If the "print all new" fax messages key is pressed in main menu 15, a voice prompt indicating the number of new messages is played and the print menu 16 is played to the subscriber. Specifically, the subscriber is instructed to press keys 1, 2, 3 or * (11). By pressing keys 1, 2 or 3 the subscriber is able to dictate where the fax is to be printed. If the subscriber presses "review fax messages" key 2 in main menu 15, a voice prompt indicating the number of new and old messages is played. He or she is then forwarded to the retrieve menu 17. Retrieve menu 17 instructs the subscriber to press 1 to retrieve new fax messages or to press 2 to retrieve old fax messages. If no fax messages are present in the system, then these options in retrieve menu 17 will not be voiced. As discussed previously, pressing the * key will return the subscriber to the previous menu which in this case is the main menu 15. If the subscriber presses the new fax messages key 1 or old fax messages key 2, he or she is taken to a review menu 18 after hearing the voice note associated with that fax message. The voice note consists of the number of pages comprising the fax and the date and time received. Review menu 18 instructs the subscriber to press key 1 to print the fax message, press key 7 to erase the document, press the # (13) key to skip to the next document or to press * (11) to return to the previous menu. If any fax messages are selected to "print" by pressing 1 in menu 18, then, after all the new or old messages have been reviewed, the subscriber is returned to menu 17. At this point the prompt "print selected now" is played and, if the subscriber presses 9 to print the fax messages that have been selected in menu 18, he or she is then routed to the print menu 16 as previously discussed. Until fax messages have been selected in menu 18, the "print selected now" prompt is not voiced in menu 17.

If, in main menu 15, the subscriber presses key 9 for personal options, he or she is routed to the personal options menu 19. At personal options menu 19, the subscriber is instructed to press 1 to change the security code, to press key 2 to specify a primary fax machine, or to press * (11) to return to the previous (main) menu.

Referring to FIG. 3, the access sequence and instructions for accessing the system are illustrated. A subscriber dials the personal fax number at 21 and receives a greeting at 22 which will instruct that subscriber to press the start button on a fax machine if the subscriber desires to send a fax. During the playing of this prompt and for five seconds following the end of the phrase, the subscriber has the opportunity to press the # (13) key. Pressing the # key at 23 in FIG. 3 delineates subscriber usage from sender usage. That is, when the subscriber presses the # key, the security code prompt is played at 24. If the # key is not pressed the fax tone is given at 25. This acts as a security feature to prevent the sender from accessing the subscriber portion of the fax mailbox.

If the caller presses the # key at 23, the subscriber is prompted to enter a security code followed by the # key at 24. The security code can be four to ten digits long. A default security code for each mailbox will be provided with the initial instructions to the subscriber. The subscriber is given three attempts to successfully enter the correct security code before being dropped from the platform. This is also a security measure to prevent hackers from occupying a port on the platform as they enter numerous combinations of digits to try to break into a mailbox. Upon being disconnected after a third unsuccessful attempt, the user can redial the mailbox and attempt another three security (code attempts before being dropped again. This sequence is illustrated by the steps in box 26 in FIG. 3.

Following successful security code entry in 26, the system checks at step 27 to determine if any new fax messages have been received. If new messages have reached the mailbox, the subscriber will hear a three note tone (28) before being routed to main menu 15. If no new messages exist, the subscriber is routed directly to main menu 15.

Figure 4:
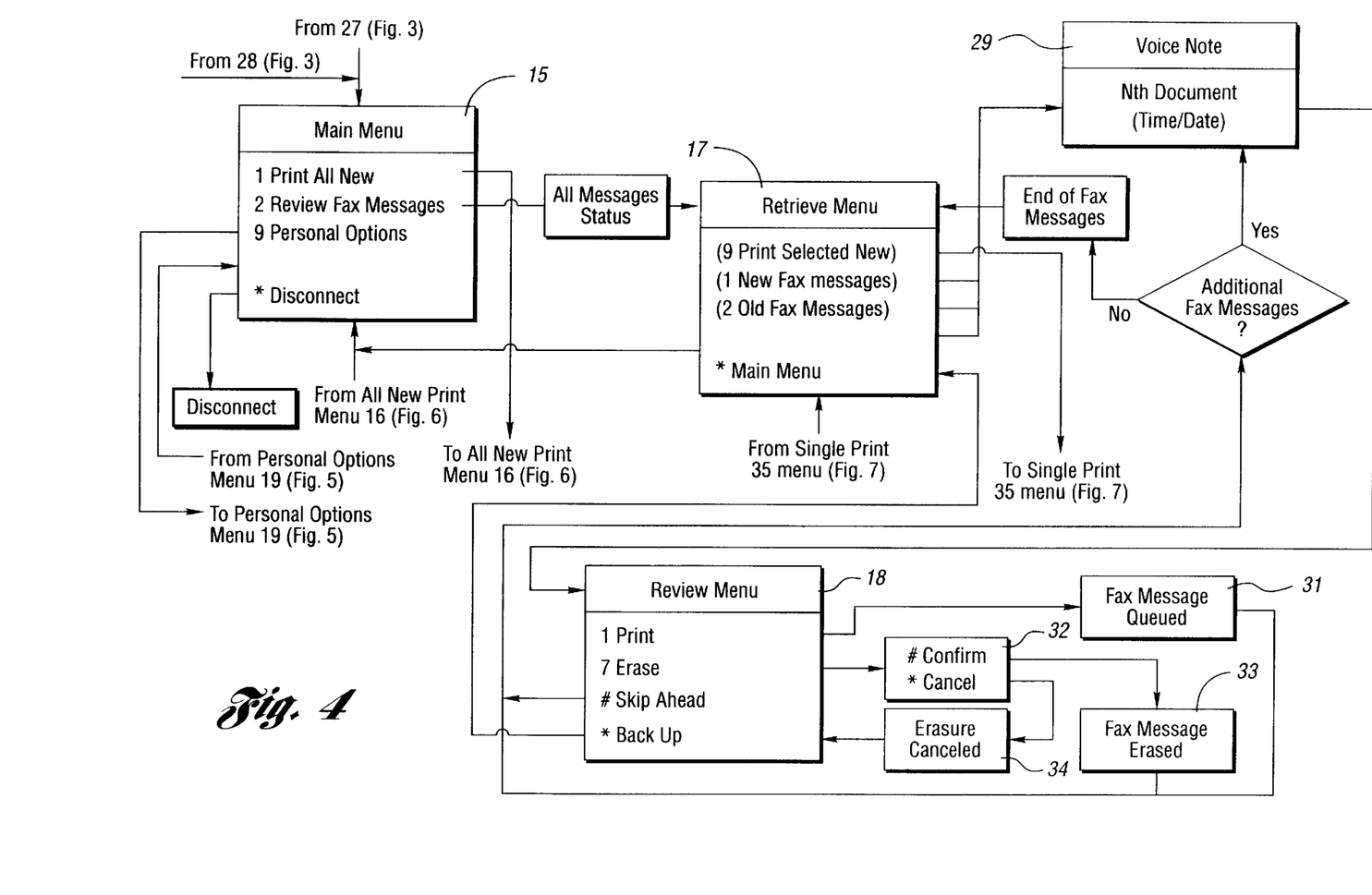
FIG. 4 is a schematic of the main menu, retrieve menu, review menu and interface instructions.

Referring to FIG. 4 in main menu 15, the subscriber has four options: print all new fax messages immediately (press 1); review all fax messages (new or old) one at a time before acting upon them (by printing or deleting) (press 2); making changes to personal options (press 9); or disconnecting from the service (press *).

Figure 7:
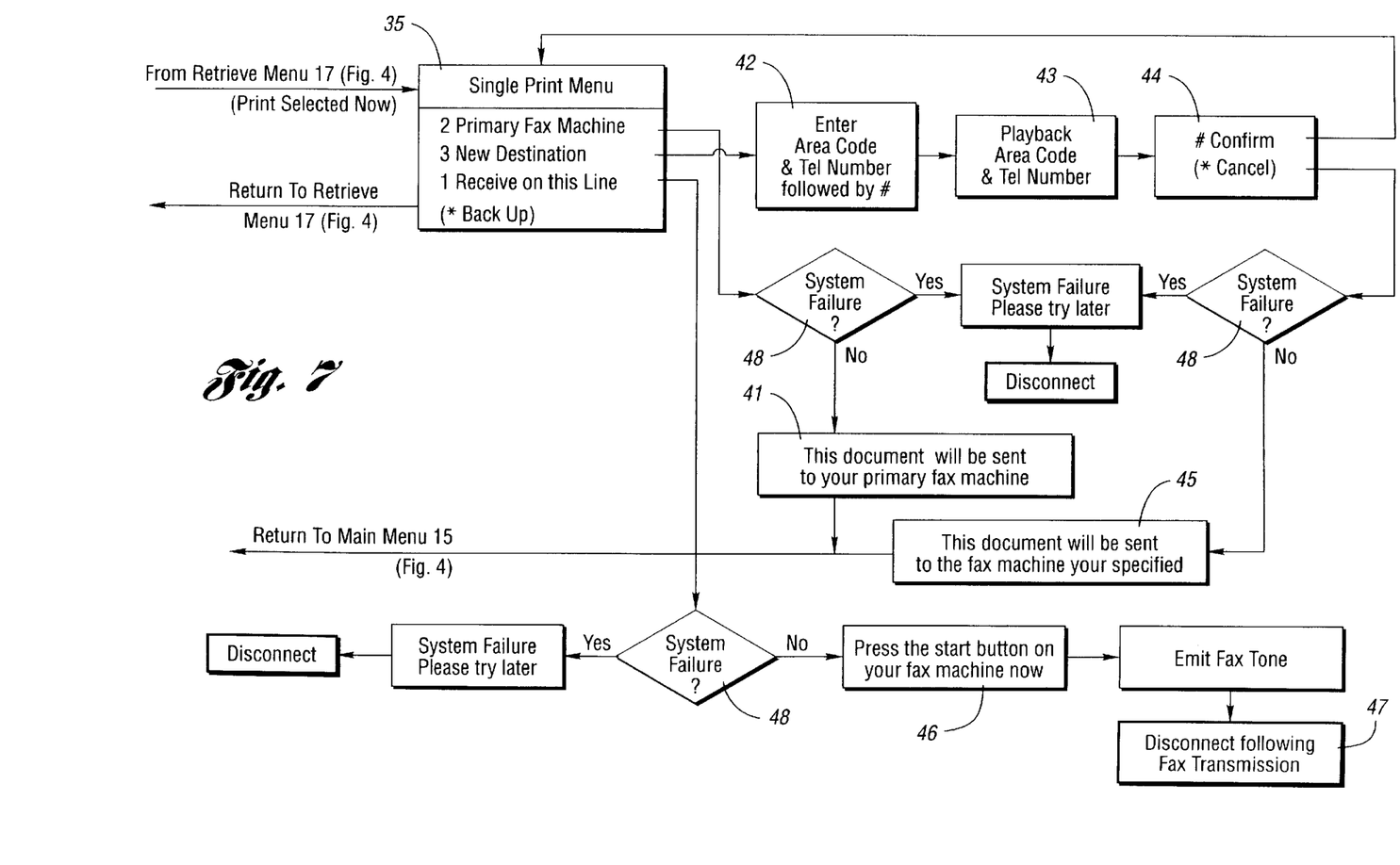
FIG. 7 is a schematic of the single print menu and interface instructions of the present invention.

If the subscriber selects the "print all new" option from main menu 15 by pressing key 1, the subscriber then hears how many new fax messages are present in the mailbox and is immediately routed to the all new print options menu 16 (FIG. 7). The subscriber can send the new fax messages to one of three locations: the fax machine from which the subscriber is calling (polling capability); the primary fax machine specified in the personal options portion of the interface; or a new fax machine destination that is entered (local, long distance or international telephone number). These selections are made in print menu 16 by pressing keys 1, 2 or 3 as shown. Following the selection of a destination for the new fax messages, the subscriber is returned to main menu 15 or in the case of polling, is disconnected from the platform once the requested new fax documents have been delivered.

Referring again to FIG. 4, if the subscriber in main menu 15 selects the review fax messages option by pressing key 2, then the subscriber hears the fax message status for all messages (new or old) in the mailbox and is routed to the retrieve menu 17. At retrieve menu 17 the subscriber selects the type of fax messages to be reviewed. Selecting a fax message type moves the subscriber to the header information for the first fax message at 29. That is, the subscriber is given the number of pages and the time and date the document was received. After hearing this information the subscriber is routed to review menu 18 to allow the subscriber to press 1 to print the document, press 7 to erase the document, press # to skip to the next fax message or press * to back up to retrieve menu 17.

If, at review menu 18, the subscriber presses 1 to print the fax document, that selected fax message is put in queue at 31 and returned to voice note 29 to indicate the information regarding the next document or, if there are no additional documents, returned to retrieve menu 17. If, at review menu 18, the subscriber presses 7 to erase the document, then a confirming sequence by pressing # to confirm the erasure or * to cancel the erasure is played at 32. If the erasure is confirmed, then the fax message is erased at 33 and the user is returned to either voice note 29 or retrieve menu 17 as previously discussed. If the erasure is cancelled at 34, the subscriber is returned to review menu 18. If at review menu 18 the # (13) key is pressed, then the fax message is skipped and the user is returned to voice note 29 or retrieve menu 17 depending upon whether further fax messages exist. If at review menu 18 the user presses the * (11) key, then the user is automatically returned to retrieve menu 17.

New fax messages in retrieve menu 17 refer to those fax documents that have reached a mailbox and have not been marked for disbursement. A new fax message that is skipped over remains as a new fax message. An old fax message in retrieve menu 17 is one that has been printed on a fax machine or other fax device. This old fax message will be stored in the mailbox for 72 hours before being automatically deleted by the platform. Converting new fax documents into old fax documents insures that fax documents can be reprinted if needed. Once the retry schedule is exhausted the fax messages are returned to the mailbox under their previous designation. The storage duration for those fax messages is unaffected.

After all fax messages of the selected type have been reviewed in the sequence previously discussed, the subscriber is directed back to retrieve menu 17 where he or she may review other types of fax messages or go directly to single print menu 35 (FIG. 7) by pressing the 9 key. As with the "print all new" option in main menu 15, once the subscriber has queued fax messages and reached the print menu 35, three destination options are available: by pressing key 1 the fax machine from which the subscriber is calling (polling capability); the primary fax machine specified in the personal options portion of the interface by pressing key 2; and, by pressing key 3, a new fax machine destination that is entered (area code and telephone number). Following the selection of a destination for the selected fix messages, the subscriber is returned to the main menu 15 or in the case of polling, is prompted to press the start button on the fax device and then disconnected from the platform once the requested fax documents have been delivered.

Figure 5:
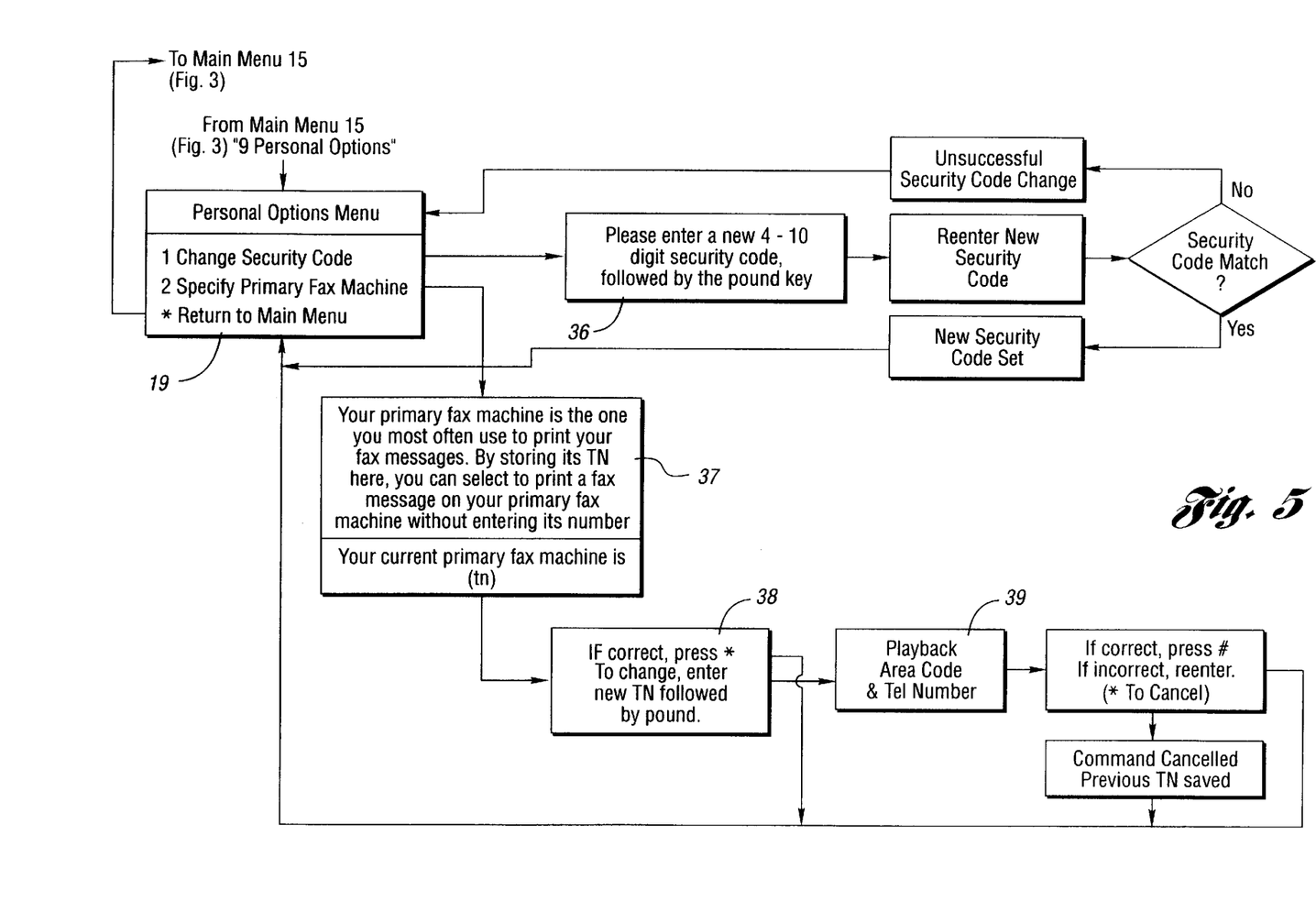
FIG. 5 is a schematic of the personal options menu and interface instructions.

If, in main menu 15, key 9 is pressed for personal options, the user is directed to personal options menu 19. Referring to FIG. 5, in personal options menu 19, the subscriber is directed to press 1 to change a security code, to press 2 to specify a primary fax machine or to press * to return to main menu 15. As previously discussed, when a subscriber initially subscribes to the system, a security code and primary fax machine number are already entered into the system. The subscriber can make changes to each as often as desired. To specify a primary fax machine, a short explanation regarding the function is provided to the subscriber before proceeding to a point where the subscriber may make changes if desired.

However, since the purpose in changing a personal security code from time to time is apparent to most subscribers no explanation precedes the point in the interface where changes to the security code can be made. If the subscriber presses 1 in personal options menu 19 to change the security code, he or she is instructed at 36 to enter a new security code. The subscriber then re-enters the security code to confirm it, which if successful, or unsuccessful, will return the subscriber to the personal options menu. Thus, the subscriber, if unsuccessful, can again attempt to change the security code. If, in personal options menu 19, the subscriber presses 2 to specify a primary fax machine, he or she is given a message at 37 to explain the need for a primary fax machine and to identify what the current primary fax machine telephone number is. At 38, the subscriber is instructed to press # if the primary fax machine number is correct and if the subscriber desires to maintain that primary fax machine number. If the subscriber desires to change the primary fax machine number, he or she is instructed to enter the new telephone number followed by pressing the # (13) key. If the subscriber presses the # key to indicate that the number is correct, he is returned to the personal options menu 19. If the primary fax machine number is changed, the newly-entered number is played back at 39 and a subscriber is again instructed to press # if it is correct which returns he or she to the personal options menu 19 or to press * to cancel if the number is incorrect at which time the subscriber will be returned to personal options menu 19.

Figure 6:
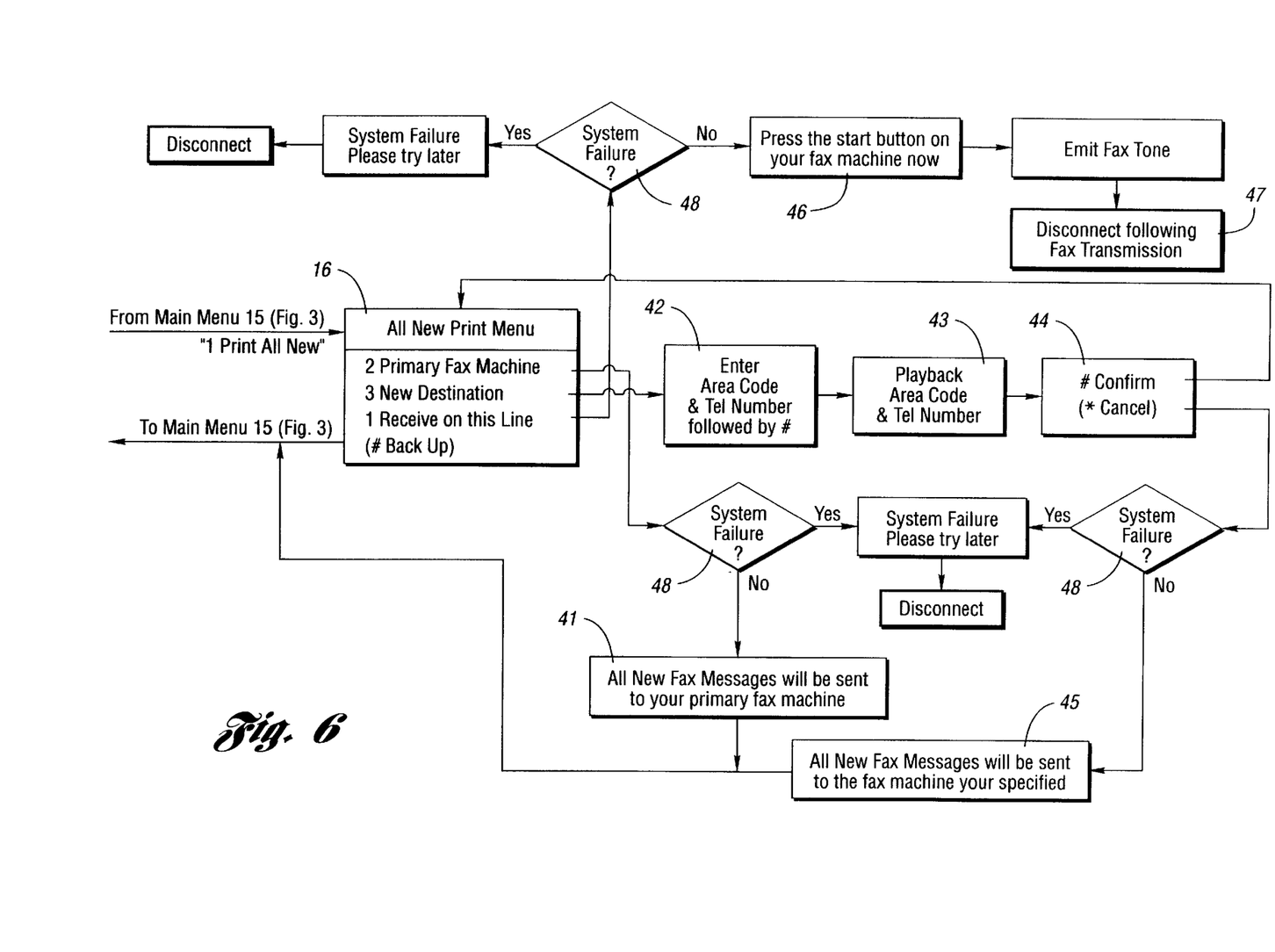
FIG. 6 is a schematic of the "all new" print menu and interface instructions of the present invention.

Referring to FIG. 6, print menu 16 and the sequence to print the fax documents is shown. That is, if the subscriber presses the print all new instruction (key 1) in main menu 15, he or she is directed to the print menu 16. Print menu 16 includes instructions to press 1 to print on the line from which the caller is calling, press key 2 to designate a primary fax machine, or press key 3 to designate a new destination. As with the other menus, instructions to press * will return the user to the previous menu which in this case would be main menu 15. If the subscriber pressed key 2 in print menu 16, the document or documents are printed on a primary fax machine as is shown at 41. Thus, in the case of tie "print all new" instruction in main menu 15, all the new documents will be printed on a primary fax machine and the user is returned to main menu 15. If the subscriber presses key 3 for new destination in print menu 16, he or she is directed to enter the area code and telephone number for the destination to which the fax should be sent, followed by the # key. This is indicated at 42. After pressing the pound key, the system will play back the area code and telephone number to which the fax is to be sent at 43. The user will then confirm this number by pressing # or cancel the number by pressing * at 44. If the # key (13) is pressed at 44 to confirm the telephone number, then, at 45, the fax documents are sent to the fax machine which has been specified. The user is then returned to main menu 15. If the cancel key (11) has been pressed at 44, then the subscriber is returned to print menu 16.

If the subscriber presses the 1 key in print menu 16 to receive the fax message or messages on the line them in use, then the subscriber is instructed to press the start button on the fax machine at 46 and the subscriber will be disconnected at 47 following the fax transmission. If, at any time in the print cycle, there is a system failure as indicated at 48 in FIG. 6, the subscriber will be notified of the system failure and disconnected from the system.

The print sequence has been described with respect to "all new" print menu 16 in FIG. 6. Referring to FIG. 7, single print menu 35 functions identically to print menu 16. Thus, the instructions and functions in FIG. 7 are numbered identically to those of FIG. 6. The only difference in FIG. 7 is that menu 35 is accessed from retrieve menu 17 in FIG. 4 by pressing key 9 in menu 17 for "print selected now." If the * key is pressed in menu 35, the subscriber is returned to retrieve menu 17 and not main menu 15 as in FIG. 6. However, after the selected documents have been printed at 41 or 45, the subscriber is returned to main menu 15 as with FIG. 6.

As is known in the art, the fax mail system of this invention may be implemented by computer software programming in a suitable platform environment. Although only specific exemplary embodiments of this invention have been described in detail, those skilled in the art will appreciate that many variations and/or modifications may be made in these exemplary embodiments without in any way departing from the novel and advantageous features of this invention. For example, while specific words have been used for various instructions and prompts, it is contemplated that different words conveying the same information could be used. Accordingly, all such variations and modifications are intended to be included within the scope of this invention as defined by the appended claims.

What is claimed is:

1. In an interface to allow a user employing a DTMF telephone keypad to interact with a fax mail system, said interface including a sequence of instructions for allowing said user to determine which of a multiplicity of functions including printing to select, the improvement wherein:

said fax mail system classifies and stores all fax messages as new fax messages until a printing function has been selected to print one of said new fax messages at which time said one of said new fax messages is reclassified and stored as an old fax message, and said interface includes an instruction to press a designated key on said DTMF telephone keypad to direct said fax mail system to print only such fax messages which are then classified and stored as new fax messages when said designated key is pressed.

2. In a method for instructing a user to interface with a fax mail system, said method including the steps of prompting said user to press particular keys on a DTMF telephone keypad, the improvement comprising:

classifying and storing all fax messages as new fax messages until a printing function has been selected to print one of said new fax messages at which time said one of said new fax messages is classified and stored as an old fax message, and prompting said user to press a predetermined key on said DTMF telephone keypad to direct said fax mail system to print only such fax messages which are then classified and stored as new fax messages when said designated key is pressed.

3. A method for handling fax messages in a fax mail system, which includes selectively printing and erasing fax messages, comprising:

storing fax messages in the fax mail system;

classifying said fax messages as new fax messages until one of said new fax messages is selectively printed at which time said one of said new fax messages is classified as a retrievable old fax message;

providing a DTMF telephone keypad for interfacing with the fax mail system; and operating the DTMF telephone keypad in order to direct the fax mail system to print only such new fax messages which have not been classified as a retrievable old fax message.

4. The method of claim 3, wherein operating the DTMF telephone keypad comprises pressing a predetermined key on the DTMF telephone keypad.

5. The method of claim 3, further comprising:

automatically deleting said old fax message if not retrieved for a predetermined period of time.

6. The method of claim 5, wherein the predetermined period of time is 72 hours.

7. The method of claim 3 wherein the fax mail system includes selectively reviewing fax messages, further comprising:

operating the DTMF telephone keypad in order to review each of said new and retrievable old fax messages.

8. The method of claim 7, further comprising:

operating the DTMF telephone keypad in order to print a reviewed fax message.

9. The method of claim 7, further comprising:

operating the DTMF telephone keypad in order to erase a reviewed fax message.

* * * * *